United States Patent [19]

Burgoyne, Jr. et al.

[11] Patent Number: 4,714,778

[45] Date of Patent: Dec. 22, 1987

[54] ALKENYLATED TOLUENEDIAMINES FOR USE IN PREPARING POLYURETHANE/UREA SYSTEMS

[75] Inventors: William F. Burgoyne, Jr., Allentown; Dale D. Dixon, Kutztown, both of Pa.

[73] Assignee: Air Products and Chemicals, Inc., Allentown, Pa.

[21] Appl. No.: 837,461

[22] Filed: Mar. 7, 1986

[51] Int. Cl.$^4$ .............................................. C07C 87/58
[52] U.S. Cl. ................................... 564/305; 564/307; 564/315; 564/322; 564/442; 564/443; 528/64; 528/68
[58] Field of Search ............... 564/305, 307, 315, 322, 564/442, 443; 528/64, 68

[56] References Cited

U.S. PATENT DOCUMENTS

| | | | |
|---|---|---|---|
| 2,403,963 | 7/1946 | Axe | 585/435 |
| 2,471,922 | 5/1949 | Axe | 585/435 |
| 2,843,565 | 7/1958 | Christenson et al. | 528/152 |
| 3,428,610 | 2/1969 | Klebert | 528/64 |
| 3,865,889 | 2/1975 | Mitchell | 585/435 |
| 4,218,543 | 8/1980 | Weber et al. | 521/51 |
| 4,440,952 | 4/1984 | Ihrman | 564/305 |
| 4,529,746 | 7/1985 | Markovs | 521/159 |

FOREIGN PATENT DOCUMENTS 0082258 8/1982 European Pat. Off. .

*Primary Examiner*—Charles F. Warren
*Assistant Examiner*—John A. Sopp
*Attorney, Agent, or Firm*—Russell L. Brewer; James C. Simmons; William F. Marsh

[57] ABSTRACT

This invention relates to a class of alkenylated toluenediamines having at least one alkenyl group ortho to an amine group. More particularly the toluenediamines are represented by the formula:

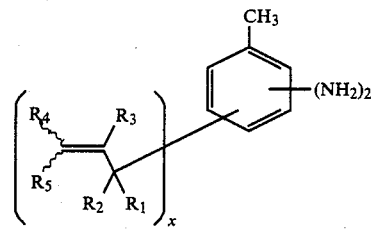

wherein $R_1$, $R_2$, $R_3$, $R_4$ and $R_5$ are hydrogen, $C_{1-3}$ aliphatic, phenyl, halogen or alkoxy radicals, or $R_2$ and $R_4$ or $R_5$ are bridged via an alkylene radical —$(CH_2)_y$— wherein y=2 to 5, and x is one or two provided that in said formula at least one of $R_1$, $R_2$, $R_3$, $R_4$ or $R_5$ is $C_1$ or greater.

The above described alkenylated toluenediamines have been found to be well suited as antioxidants and as tri- and tetra functional chain extenders in forming polyurethane/urea elastomers systems and for providing pendant unsaturation for post curing and polymerization.

31 Claims, No Drawings

ALKENYLATED TOLUENEDIAMINES FOR USE IN PREPARING POLYURETHANE/UREA SYSTEMS

TECHNICAL FIELD

This invention pertains to alkenylated toluenediamines having particular suitability for antioxidant use and for post curable, cross-linkable polyurethane/urea elastomer systems.

BACKGROUND OF THE INVENTION

Alkylated diamines have been known for a substantial period of time and find use in the preparation of polyurethane elastomers. The diamines are typically used in that form as chain extenders for polyurethanes, i.e., forming a short chain urea linkage to strengthen the elastomer. As is known, the alkyl group alters the reactivity of the amine thus giving the composition unique processing properties for producing polyurethane elastomers.

A secondary use for the alkylated diamine products is in the manufacture of diisocyanates which are also suited for the synthesis of polyurethane elastomers. They can also be used for plasticizers, or as intermediates for the manufacture of pesticides and alkyd resin modifiers.

Two types of synthesis techniques have been used to produce alkylated aromatic amines, such as, an alkylated toluenediamine. One of the earliest techniques used to prepare an alkylated aromatic diamine employed a Freidel-Crafts alkylation of an aromatic hydrocarbon, then dinitration of the alkylated aromatic hydrocarbon followed by reduction of the nitro groups to amine groups. The diamine could be converted to the diisocyanate by reaction with phosgene. Another technique for producing an alkylated aromatic amine involved nitration of an aromatic hydrocarbon, followed by reduction to the amine and then alkylation of the amine.

Representative patents illustrating various alkyl aromatic diamines and derivatives thereof are as follows:

U.S. Pat. Nos. 3,428,610 and 4,218,543 disclose the use of alkylated toluenediamines in the manufacture of polyurethane resins with the '543 patent showing its use in RIM manufacturing techniques. Alkylated diamines include 1-methyl-3,5-diethylpheylene-2,4-diamine and 1,3,5-trimethylphenylene-2,4-diamine. The diethyltoluenediamine derivative is best known and is referred to as diethyl TDA or DETDA and is probably the most widely used alkylated aromatic diamine for RIM manufacture.

U.S. Pat. No. 4,440,952 shows the synthesis of 1-methyl-2,4-diamino-5-isopropylbenzene and 1-methyl-2,6-diamino-3-isopropylbenzene and the use of the 2,6-isomer as a chain extender for polyurethanes.

European Pat. No. 0069286 discloses various alkyl-substituted phenylenediamines as chain extenders for the production of polyurethanes by reaction injection molding techniques. Some of the compositions suggested as being suited for such use include the 1,3-dimethyl-5-tert-butyl-2,6-diaminobenzene, 2-methyl-4,6-di-tert-butyl-1,3-diaminobenzene, 1,3-dimethyl-5-tert-amyl-2,4-diaminobenzene or its equivalent.

U.S. Pat. No. 4,529,746 discloses the synthesis of $C_{1-4}$ alkylated vicinal toluenediamines and their use as extenders for the preparation of polyurethane-polymer elastomers. The example shows an ethylated vicinal toluenediamine.

Aromatic compositions having unsaturated organo substituents are known and have been prepared by alkylation of aromatic compositions with diolefins. Some patents which show the manufacture of aromatic compositions having unsaturated organo substituents include:

U.S. Pat. No. 2,403,963 which discloses the reaction of benzene and butadiene in the presence of a boron trifluoride catalyst. Phenylbutenes are produced.

U.S. Pat. No. 2,471,922 discloses that aromatic hydrocarbons, which include phenols and aromatic halides, can be reacted with 1,3-diolefins to produce alkenyl derivatives. Examples of low-boiling 1,3-diolefins which can be used in the alkenylation include 1,3-butadiene, 1,3-pentadiene and so forth. Catalyst systems included boron trifluoride and boron trifluoride-phosphoric acid systems.

U.S. Pat. No. 3,865,889 discloses the preparation of an alkenylated aromatic hydrocarbon such as those obtained by reacting butadiene with an alkylbenzene, e.g., toluene or xylene. An alkali metal promoter is used to catalyze the reaction.

U.S. Pat. No. 2,843,565 discloses the production of butenyl-phenol-aldehyde resins which involves the reaction of an alkenylphenol; with formaldehyde. Conjugated dienes such as piperylene, cyclopentadiene, 1-chloro-2-methyl-butadiene are reacted with phenols in the presence of phosphoric acid catalyst and the reaction product then reacted with formaldehyde.

West German Pat. No. 1,079,628 discloses the preparation of cyclopentenyl-substituted aromatic amines by reacting cyclopentadiene at elevated temperature in the presence of bleaching earth with primary, secondary or tertiary aromatic amine substrates. Aniline, N-methylaniline, chloroaniline, and phenylenediamine are suggested candidates.

European Pat. No. 0082258 discloses various meta-phenylenediamines having one or two benzyl rings having lower reactivity due to steric hindrance. Steric hindrance is effected through the use of an aromatic substituent which also may be substituted with various groupings. An example of an amine is 4,6-bis ($\alpha,\alpha$ dimethylbenzyl)-1,3-phenylenediamine prepared by reacting 2-methylstyrene with meta-phenylenediamine.

SUMMARY OF THE INVENTION

This invention pertains to alkenylated toluenediamine and derivatives thereof and particularly to mono-alkenylated toluenediamine. In contrast to prior art aromatic diamine compositions, the organo group contains carbon-carbon unsaturation and is polymerizable with amine-reactive difunctional condensation monomers such as dicarboxylic acids and their esters, diisocyanates, and diepoxides and also polymerizable with other unsaturated monomer systems. These aromatic diamine compositions are represented by the formula:

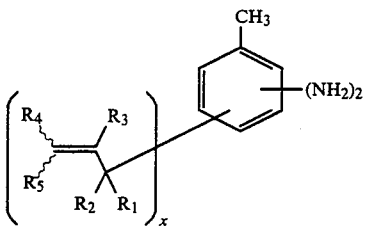

wherein $R_1$, $R_2$, $R_3$, $R_4$ and $R_5$ are hydrogen, $C_{1-3}$ aliphatic, phenyl, halogen or alkoxy radicals or $R_2$ and $R_4$ or $R_5$ are bridged via an alkylene radical—$(CH_2)_y$—wherein $y=2$ to 5, and x is one or two provided that in said formula at least one of $R_1$, $R_2$, $R_3$, $R_4$ or $R_5$ is $C_1$ or greater.

There are several advantages associated with the specific compositions of this invention and these advantages include:

a toluenediamine composition which has an unsaturated organo group ortho to an amine, for providing antioxidant activity for rubber and hydrocarbons such as fuels and oils;

a toluenediamine composition having antioxidant characteristics that provides for attachment of organic radicals or polymers at one or both nitrogens which allows for tailoring of the solubility characteristics;

a toluenediamine composition which has an unsaturated organo group ortho to an amine for providing desirable reactivity for reaction injection molding (RIM) of urethane and polyurea elastomer systems;

alkenylated toluenediamines which can be converted to aromatic diisocyanates having a carbon-carbon unsaturation for producing unique properties in polyurethane and polyurea resin systems, latexes, UV curable coatings and adhesives and as reactive diluents for polyesters;

an ability to form polyurethane-urea elastomers systems, either through the diamine functionality or isocyanate functionality, if converted;

an ability to produce a variety of resin systems, e.g., polyurethane systems; and other condensation polymers such as polyamides, polyesters, and polyethers; and an ability to effect reaction between various resin systems and polymerizable monomers and thereby introduce monomer groups for desirable end properties.

DETAILED DESCRIPTION OF THE INVENTION

The compounds of this invention, as indicated above, are represented by the formulas:

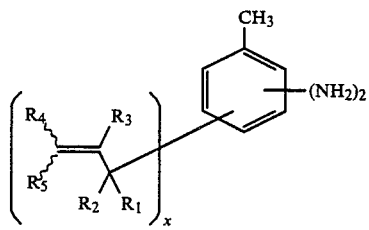

wherein $R_1$, $R_2$, $R_3$, $R_4$ and $R_5$ are hydrogen, $C_{1-3}$ aliphatic, phenyl, halogen or alkoxy radicals or $R_2$ and $R_4$ or $R_5$ are bridged via an alkylene radical—$(CH_2)_y$—wherein $y=2$ to 5, and x is one or two provided that in said formula at least one of $R_1$, $R_2$, $R_3$, $R_4$ or $R_5$ is $C_1$ or greater.

The structural formula has been written to reflect that stereo chemistry exists in the reaction product and $R_5$ may be cis or trans to $R_3$. When $R_5$ is cis with $R_3$, then $R_4$ is combined with $R_2$ rather than $R_5$ being combined with $R_2$ in order to form a $\beta,\gamma$-unsaturated ring.

The compounds of this invention are synthesized by alkylating toluenediamine with a conjugated diene having from 4 to about 12 carbon atoms. It is because the alkenylation is effected via the amino group that one is able to introduce at least one alkenyl group in a position ortho to an amine group and achieve unique results associated with the specific regiochemistry associated with those isomers. These unique properties include antioxidant characteristics and, urethane processability characteristics.

Much of the art describing the manufacture of alkenylated aromatic hydrocarbons uses a homogenous catalyst system, e.g., boron trifluoride or boron trifluoride-phosphoric acid mixture or weakly acidic heterogenous catalyst systems. Other art in the manufacture of alkylated aromatic amines uses bleaching earths, clays, montmorillonite and alkali metal ion exchanged zeolites. In contrast to the prior art method for producing alkenylated phenols and alkylated aromatic amines, it is our belief alkenylated aromatic amines are best prepared using silica-alumina or crystalline molecular sieves which are solid phase and have an acidity factor of at least 0.3 and preferably in excess of 0.8 as the catalyst. The acidity factor is a measurement of acidity of the zeolite catalyst and involves contact of the catalyst with ammonia under adsorption conditions followed by desorption. More particularly, one gram of catalyst is contacted with ammonia at room temperature and then desorbed by heating to a temperature from ambient to 200° C. at a rate of 10° per minute, then holding at 200° C. for two hours. The amount of ammonia irreversibly adsorbed by one gram at 200° C. is indicative of acidity and indicative of the strength of the amine/acid bond. The acidity factor then is the amount of ammonia irreversibly adsorbed expressed in millimoles per gram of catalyst at 200° C. and as stated this level should be at least 0.3 and preferably 0.8 millimoles ammonia per gram of catalyst.

Zeolites which can be utilized for alkenylation of toluenediamines include X, Y, faujasite, ferrierite, offretite, chabazite, gmelinite, erionite, ferrierite, mordenite and the ZSM family. When initially prepared, the cation in the crystalline molecular sieve is an alkali metal, typically sodium. This ion must be exchanged in sufficient proportion, usually, 60% or greater, with an acidic ion such as a rare earth metal, e.g., lanthanum, praseodymium; hydrogen or some of the transition metals such as nickel, copper, chromium and the like. The substitution of various ions for the sodium ion alters the acidity of crystalline molecular sieve, thus making it more reactive and catalytically effective for ring alkenylation of the aromatic amine.

The naturally occurring and synthetic zeolites used in the process normally have a silica to alumina molar ratio from about 2 to 25:1. However, if the silica to alumina ratio is low or acidity borders on the low side of that desired, the silica to alumina ratio and acidity of the zeolite may be altered by a technique called dealumination. In effect, the practice of dealumination decreases the alumina content in the zeolite thereby increasing the silica to alumina ratio. The removal of alumina from the internal structure affects acidity and may also enlarge the cage structure or pore size of zeolite to permit entry of and diffusion of larger molecules into its internal structure. Thus, one may be able to utilize a particular cation in a dealuminated zeolite, but not use the same cation in its non-dealuminated state. This is because the original cation may not have provided sufficient acidity for effecting ring alkenylation of toluenediamine. Some of the techniques for dealumination include chelation, dehydration or acidification, the latter entailing the treatment of the zeolite with an inorganic acid. Techniques suited for dealumination of zeolites are well known.

Zeolites and crystalline molecular sieves are porous materials with the pores having generally uniform molecular dimensions. Cavities or cages are formed in this zeolite or molecular sieve and connected by channels of generally defined diameter. For the practice of this invention the pore diameter should be sufficiently large to permit the molecules to effectively enter the interior of the molecular sieve for reaction and to exit as final product. Typically, the pore size will range from about 6 to 15 Angstroms, but the size of a pore required for reaction can vary depending upon the product being produced. If conversion levels appear low for the particular catalyst, that level may be due to reactant diffusion resistance through the molecular sieve. If that is the case, a molecuar sieve of slightly larger pore size should be tried.

Molecular sieves have been developed which have been defined as nonzeolites but have a cage structure that performs similarly to zeolites. In many cases, they contain alumina and silica in combination with other components, e.g., phosphorous, boron, germanium, titanium, etc. In the alkenylation of toluenediamines as described here, they perform similarly to zeolites, and representative crystalline molecular sieves are described in U.S. Pat. No. 4,440,871; European Pat. Nos. 124,119 and 121,232 and the subject matter of these patents incorporated by reference. Borosilicate and borogermanate zeolites, although not disclosed in these patents, possibly can also be used. For purposes of practicing this invention, i.e., in the production of alkenylated toluenediamines, molecular sieves are deemed equivalent to and included as catalyst material.

The aromatic amine used in the alkenylation reaction is toluenediamine and the toluenediamine isomers include the 2,4-; 2,6-; and the 2,3 and 3,4-vicinal toluenediamine derivatives. The methyl radical is in the one position. The alkenylated toluenediamines are prepared by reacting toluenediamine with a diolefin in the presence of an acidic solid phase catalyst, particularly the crystalline molecular sieves as described.

Diolefins useful in this invention are acyclic and cyclic conjugated dienes. Examples of some dienes are 1,3-butadiene, isoprene, chloroprene, 2,3-dimethyl-1,3-butadiene, piperylene, 2-methyl-1,3-pentadiene, 2,4-hexadiene, 3,4-dimethyl-2,4-hexadiene, 2-phenyl-1,3-butadiene, 2-methoxy-1,3-butadiene, 2,5-dimethyl-2,-4-hexadiene, cyclopentadiene, dicyclopentadiene, methylcyclopentadiene and 1,4-cyclooctadiene.

Some preferred compositions are listed below.

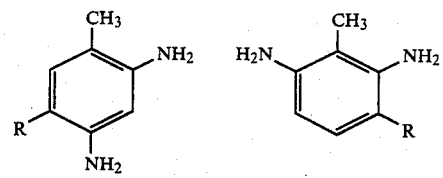

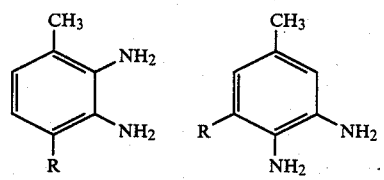

wherein R = —CH$_2$CH=CHCH$_3$
= —CH$_2$CH=C(CH$_3$)$_2$
= —C(CH$_3$)$_2$CH=CH$_2$
= —C(CH$_3$)$_2$CH=C(CH$_3$)$_2$

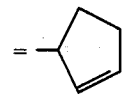

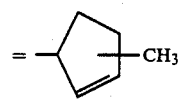

Ring alkenylation of the 2,4-and 2,6-as well as the vicinal 2,3- and 3,4- toluenediamines is effected by reacting toluenediamine with the diolefin at temperatures ranging from about 100° to 250° C. and preferably from about 140° to 220° C. The pressures will range from about 15 to 2000 psig and generally in the range of 100 to 1000 psig. It is common practice to alter the temperature and the pressure within the above ranges specified to optimize selectivity and conversion to the desired product. Mole ratios of olefin to toluenediamine used in the reaction will range from about 1:5 to 10:1 and the reaction time will generally be from about 2 to 48 hours when synthesized in an autoclave or within 0.05 to 6 hr −1, expressed as a liquid hourly space velocity (LHSV) for fixed bed continuous operation.

In the ring alkenylation of toluenediamines utilizing the solid acid catalyst systems the diolefins, and particularly the olefins having conjugated unsaturation, tend to polymerize and generate substantial amounts of by-product polymer. In many cases the combination of reactant and catalyst preclude the formation of alkenylated toluenediamines and substantially all of the olefin is converted to by-product polymer. Butadiene and cyclopentadiene are two offenders and both polymerize readily under the reaction conditions providing low yields of ring alkenylation. To avoid polymer production it is necessary to carry out the ring alkenylation of toluenediamine in the presence of a solvent which is inert to reaction with toluenediamine or the olefin and does not promote polymerization. Solvents which can be best utilized generally have a dielectric constant in the range of 1.5 to 3.0 and include paraffins such as pentane, hexane, heptane, octane, decane; toluene and xylene, paraffinic naptha fractions, kerosene; and cycloparaffin hydrocarbons having from about 5 to 10 carbon atoms, e.g., cyclohexane and so forth.

The alkenylated toluenediamines may be used as pure isomers by themselves or as a mix for example in the form of the 2,4- and 2,6-isomer mix or in conjunction with a small amount of the alkenylated vicinal toluenediamine derivatives. A mixture of the 2,4-isomer and 2,6-isomer, in a weight ratio from about 65–80% of the 2,4- and 20–35% of the 2,6-isomer, is attractive for a number of reasons. One reason is that a commercial feedstock of toluenediamine typically contains 80% of the 2,4-isomer and 20% of the 2,6- isomer. If separation of the 2,4 and 2,6-isomers from the vicinal toluenediamine isomers is not effected, then from about 2 to 5% of the vicinal toluenediamine isomers may be present in that system. A second reason is that the weight ratio of the 2,4- and 2,6- toluenediamine isomer mix, when alkylated, provides sufficient time for formulation of urethane systems for RIM processing. The amino groups which are blocked by a methyl group or an alkenyl group, or both, are deactivated and provide extended pot life as a diamine chain extender.

The alkenylated toluenediamines described herein have a variety of uses and can be used in preparing coatings and adhesives. In contrast to currently available urethane coating systems having unsaturation therein, e.g. those containing glycerides of linseed oil or other siccative oil in an isocyanate prepolymer backbone, the unsaturation is pendant from the backbone. When the unsaturation is in the polymer backbone, as in the prior art, one may experience difficulty in obtaining desirable polymerization rates and in obtaining desirable rates for post curing of the reactive unsaturation. With the alkenylated toluenediamines, the unsaturation is pendant from the polymer backbone and permits faster post curing while still providing a desirable aromatic ring in the backbone.

The text, *Polyurethanes Chemistry and Technology* by Saunders and Frisch, (1964) has several chapters relating to the utilization of polyurethanes having unsaturation therein; such chapters include applications for coatings, adhesives, and fibers.

In addition to formulating polyurethanes or polyurea elastomers, the pendant unsaturation in the alkenylated toluenediamine can be polymerized by conventional techniques with other polymerizable monomers, to enhance the physical properties of the elastomers systems. Typical monomers which may be polymerized with the pendant unsaturation include vinyl acetate, lower alkyl ($C_{1-6}$) esters of acrylic and methacrylic acid, vinyl chloride, vinylidine chloride, styrene, butadiene, isoprene, and cyclopentadiene.

One of the problems associated with effecting polymerization of the alkenylated toluenediamines with other polymerizable monomers is the relatively slow polymerization activity of the alkenylated aromatic diamine. During alkenylation, rearrangement of the double bond occurs and the double bond becomes allylic to the aromatic ring. As is known, the reactivity of the allylic double bond is low and catalyst levels and conditions may require adjustment to obtain desirable polymerization rates. The bond may possibly be isomerized to a conjugated relationship with the ring.

The alkenylated toluenedamines described herein have also been found to be excellent antioxidants for oils and rubber. The high antioxidant activity coupled with synthesis based on relatively inexpensive raw materials provides for products having a desirable cost/performance ratio. The alkenylated products have been evaluated for use in hydraulic oil and natural rubber, but it is believed the antioxidant properties will be generally useful for adhesives, sealants, coatings, elastomers, plastics, and petroleum products such as hydrocarbon fuels.

The following examples are provided to illustrate preferred embodiments of the invention and are not intended to restrict the scope thereof. All parts are part by weight and all percentages are expressed as weight percent unless otherwise specified.

EXAMPLE 1

Preparation of 5-(cyclopent-2-enyl)-2,4-toluenediamine

A 200 g (1.64 mol) portion of 2,4-toluenediamine, 162 g (1.23 mol, 2.45 equiv) of dicyclopentadiene, 200 g (2.78 mol) of pentane, and 20.0 g of an amorphous alumina-silica catalyst comprised of 13% alumina and 87% silica were charged to a 1000 cc pressure vessel equipped with a mechanical stirrer. The vessel was sealed and purged with nitrogen leaving a 32 psig nitrogen blanket. The vessel contents were heated to 205° C. with stirring and were maintained at that temperature for 22 hr. The contents were cooled to 150° C. and isolated catalyst free by hot filtration. Selective removal of residual hydrocarbons by vacuum distillation and analysis by gas chromatography (GC) revealed the following product mixture:

|  | GC Area % |
|---|---|
| 2,4-toluenediamine | 36.02 |
| 3-(cyclopent-2-enyl)-2,4-toluenediamine | 2.51 |
| 5-(cyclopent-2-enyl)-2,4-toluenediamine | 57.34 |
| Other Aromatic Diamine derivatives including 3,5-di(cyclopent-2-enyl) 2,4-tolunediamine | 4.13 |
|  | 100.0% |

Conversion of 2,4-toluenediamine = 64%

The example shows that both positions ortho to each amine are reactive to alkenylation, but as one might expect, the 5 position is more reactive than the 3-position. The dicyclopentadiene is cracked in situ, forming cyclopentadiene under the reaction conditions. Analysis of the hydrocarbons in the product mixture prior to distillation shows only cyclopentadiene and pentane present. No significant amounts of cyclopentadiene oligomers were formed.

EXAMPLE 2

Preparation of 3-(cyclopent-2-enyl)-2,6-toluenediamine

A 200 g (1.64 mol) portion of 2,6-toluenediamine, 162 g (1.23 mol, 2.45 equiv) of dicyclopentadiene, 200 g (2.78 mol) of pentane, and 20.0 g of a catalyst comprised of 13% alumina and 87% silica were charged to a stirred vessel and reacted at 205° C. in a similar fashion as indicated in Example 1. Isolation of a catalyst free sample by hot filtration followed by selective removal of all residual hydrocarbon by distillation afforded the following product mixture:

|  | GC Area % |
|---|---|
| 2,6-toluenediamine | 51.32 |
| 3-(cyclopent-2-enyl)-2,6-toluenediamine | 43.67 |
| Other Aromatic Diamine including 3,5-di(cyclopent-2-enyl)-2,6-toluenediamine Derivatives | 5.02 |
|  | 100.0% |

Conversion of 2,6-toluenediamine = 49%

Examples 1 and 2 show that both the 2,4- and 2,6-isomer of toluenediamine are reactive to alkenylation using an acidic alumina-silica catalyst in the presence of a solvent system.

EXAMPLE 3

Preparation of
3-(3-methylbut-2-enyl)-2,6-toluenediamine

A 200 g (1.64 mol) portion of 2,6-toluenediamine, 167 g (2.45 mol) of isoprene, 200 g (2.78 mol) of pentane, and 20 g of powdered H-Y zeolite were reacted at 150° C. in a similar fashion as indicated in Example 1. Isolation of a catalyst free sample was obtained by hot filtration. Selective removal of all residual hydrocarbon by vacuum distillation afforded the following product mixture:

|  | GC Area % |
|---|---|
| 2,6-toluenediamine | 50.30 |
| 3-(3-methylbut-2-enyl)-2,6-toluenediamine | 41.49 |
| Other Aromatic Diamine including 3,5-di(3-methylbut-2-enyl)-2,6-toluenediamine derivatives | 8.21 |
|  | 100.0% |

Conversion of 2,6-toluenediamine = 50%

EXAMPLE 4

Preparation of 3-(3-methylbut-2-enyl) and 5-(3-methylbut-2-enyl)-2,4-toluenediamines.

A 200 g (1.64 mol) portion of 2,4-toluenediamine, 167 g (2.45 mol) of isoprene, 200 g (2.78 mol) pentane, and 20 g of a catalyst comprised of 13% alumina and 87% silica were reacted at 200° C. in a similar fashion as indicated in Example 1. Isolation of catalyst free sample was accomplished by hot filtration. Selective removal of all residual low boiling hydrocarbons by vacuum distillation afforded the following product mixture:

|  | GC Area % |
|---|---|
| 2,4-toluenediamine | 60.38 |
| 3-(3-methylbut-2-enyl)-2,4-toluenediamine | 12.23 |
| 5-(3-methylbut-2-enyl)-2,4-toluenediamine | 16.01 |
| Other Aromatic Diamine derivatives including 3,5-di(3-methylbut-2-enyl)-2,4-toluenediamine derivatives | 11.38 |
|  | 100.0% |

Conversion of 2,4-toluenediamine = 40%

EXAMPLE 5

Preparation of 5-(cyclopent-2-enyl)-2,4-toluenediamine over a 13% Alumina/87% Silica Catalyst without Solvent.

A 300 g (2.45 mol) portion of 2,4-toluenediamine, 243 g (1.84 mol, 3.68 equiv.) of dicyclopentadiene, and 30 g of a 13% alumina/87% silica catalyst were reacted in a manner similar to Example 1. The reaction was carried out without solvent at a temperature of 225° C. for 17 hr. The product was isolated as a solid, polymeric mass. Most of the oligomerized cyclopentadiene present in the reaction mixture, could be decomposed and removed by heating the sample to 160° C. under vacuum. The toluenediamine derivatives were then isolated from the residual polymer and tars by vacuum distillation over a temperature range of 120°-180° C. at 0.1 mm Hg pressure. Analysis of the aromatic diamine products is provided below:

|  | GC Area % |
|---|---|
| 2,4-toluenediamine | 53.39 |
| 3-(cyclopent-2-enyl)-2,4-toluenediamine | 3.16 |
| 5-(cyclopent-2-enyl)-2,4-toluenediamine | 37.69 |
| Other Aromatic Diamine derivatives | 5.76 |
|  | 100.0% |

Conversion of 2,4-toluenediamine = 47%

The isolated yield of alkenylated product in this experiment was much less than the yield realized in Example 1. It is believed that because a solvent was not used in this experiment much of the cyclopentadiene was converted to polymeric material and therefore not available for reaction.

EXAMPLE 6

Alkenylation of 2,4-toluenediamine with Isoprene Over 13% Alumina/87% Silica Catalyst Without Solvent A 90.0 g (0.735 mol) portion of 2,4-toluenediamine, 75.0 g (1.10 mol) of isoprene, and 9.0 g of the 13% alumina/87% silica catalyst were charged to a 300 cc pressure vessel equipped with a mechanical stirrer. The reaction was carried out without solvent at a temperature of 200° C. for 25 hr. The product was isolated and the catalyst was removed by filtration. The catalyst-free product was dissolved into a minimal amount of methanol then extracted with toluene. The toluene extract resulted in 43.9 g of isoprene derived polymer, accounting for 59% of the isoprene charged to the reaction mixture. Analysis of the methanol phase revealed the following aromatic amine product distribution:

|  | wt % |
|---|---|
| 2,4-toluenediamine | 80.78 |
| 3,(3-methylbut-2-enyl)-2,4-toluenediamine | 8.28 |
| 5-(3-methylbut-2-enyl)-2,4-toluenediamine | 10.94 |
|  | 100.00% |

Conversion of 2,4-toluenediamine = 19%

The beneficial results of solvent addition are demonstrated by comparison of this example to examples 4 and 5. The amount of isoprene derived polymer is substantially reduced by addition of solvent as in Example 4. The importance of solvent addition in the preparation of alkenylated toluenediamine is magnified when the reaction is carried out with a highly reactive conjugated diene, e.g. isoprene or butadiene vis-a-vis cyclopentadiene. Furthermore, a doubling of the conversion of 2,4-toluenediamine is realized by the claimed technique.

EXAMPLE 7

Antioxidant Testing in Hydraulic Oil

The test candidate toluenediamines, were evaluated for antioxidant properties for hydraulic oil. The evaluation was performed by the ASTM method D2272-67 entitled "Oxidation Stability of Steam Turbine Oils by Rotating Bomb" using Sunvis 21 (a light hydraulic oil) as the test oil. A good antioxidant will have an oxidation inhibition time (RBOT) greater than 150 min. at 0.5 wt. % utilization.

The chemicals designation and their respective test results are tabulated as follows:

| TEST COMPOUND | RBOT TIME MINUTES |
| --- | --- |
| Control Medium - Sunvis 21 Mineral Oil | 33 |
| Stalite S* | 151 |
| 2-(cyclopent-2-enyl)-aniline | 92 |
| 2,4-toluenediamine | 118 |
| 5-(cyclopent-2-enyl)-2,4-toluenediamine | 223 |
| 3-(cyclopent-2-enyl)-2,6-toluenediamine | 268 |
| 3-(3-methylbut-2-enyl)-2,6-toluenediamine | 293 |
| 5-tert-butyl-2,4-toluenediamine | 277 |

*a commercially available antioxidant

The cyclopentenyl derivatives of toluenediamine show good antioxidant activity having oxidation inhibition times in the range of 220–260 min. at 0.5 wt % utilization. Similarly, excellent activity is observed for the prenyl derivative of 2,6-toluenediamine. Although not intending to be bound by theory the data show that the excellent antioxidant activity results from the presence of a $\beta$, $\delta$- unsaturated moiety appended to the aromatic ring and the amine groups being meta to each other.

EXAMPLE 8

Antioxidant Testing in Natural Rubber

The test candidate toluenediamines, i.e., 3-(cyclopent-2-enyl)-2,6-toluenediamine and 5-(cyclopent-2-enyl)-2,4-toluenediamine were evaluated for antioxidant properties for rubber. The evaluation was performed by a conventional ASTM method and compared against the commercial antioxidants Agerite Superlite Solid and Agerite Stalite S.

The sample compositions evaluated in this experiment are listed below.

| Compound | Antioxidant Compounds |
| --- | --- |
| Agerite Superlite Solids | 1 |
| | 2 |
| Agerite Stalite S | 3 |
| 3-(cyclopent-2-enyl)-2,6-toluenediamine (3CPTDA) | 4 |
| 5-(cyclopent-2-enyl)-2,4-toluenediamine (5CPTDA) | 5 |

These compounds were incorporated into a rubber material and evaluated in accordance with the test procedures in Table I which follows.

TABLE I

| Additive Antioxidant Compound | 1 | 2 | 3 |
| --- | --- | --- | --- |
| Antioxidants in Natural Rubber | | | |
| Smoked Sheet | 100 | 100 | 100 |
| Stearic Acid | 2 | 2 | 2 |
| Zinc Oxide | 5 | 5 | 5 |
| TiO$_2$ | 20 | 20 | 20 |
| DIXIE CLAY | 50 | 50 | 50 |
| Camel WITE | 50 | 50 | 50 |
| Sulfur | 2.75 | 2.75 | 2.75 |
| ALTAX | 1 | 1 | 1 |
| METHYL TUADS | .1 | .1 | .1 |
| AGERITE SUPERLITE S | — | 2 | — |
| AGERITE STALITE S | — | — | 2 |
| 3CPTDA | — | — | — |
| 5CPTDA | — | — | — |
| Physical Properties | | | |
| Press cures at 153 C. (307 F.) | | | |
| Cured: 10 Minutes | | | |
| 300% Modulus, psi | 990 | 890 | 910 |
| Tensile, psi | 2290 | 2390 | 2350 |

TABLE I-continued

| % Elongation | 490 | 540 | 500 |
| --- | --- | --- | --- |
| Hardness | 55 | 55 | 53 |
| After Aging 2 Days in Test Tubes @ 100 C. (212 F.) | | | |
| Tensile, % Retained | 34 | 67 | 87 |
| Elongation, % Retained | 53 | 70 | 86 |
| Hardness, Points Changed | +3 | +9 | +9 |
| After Aging 4 Days in Test Tubes @ 100 C. (212 F.) | | | |
| Tensile, % Retained | 21 | 49 | 69 |
| Elongation, % Retained | 24 | 56 | 72 |
| Hardness, Points Changed | +2 | +8 | +12 |
| G.E. Brightness - Before and After 24 Hours Under R.S. Lamp | | | |
| Before Exposure | 54.7 | 54.6 | 55.8 |
| After Exposure | 31.9 | 26.8 | 26.4 |

| Compound Antioxidant Compound | 4 | 5 |
| --- | --- | --- |
| Smoked Sheet | 100 | 100 |
| Stearic Acid | 2 | 2 |
| Zinc Oxide | 5 | 5 |
| TiO$_2$ | 20 | 20 |
| DIXIE CLAY | 50 | 50 |
| Camel WITE | 50 | 50 |
| Sulfur | 2.75 | 2.75 |
| ALTAX | 1 | 1 |
| METHDYL TUADS | .1 | .1 |
| 3CPTDA | 2 | — |
| 5CPTDA | — | 2 |
| Physical Properties | | |
| Press cures at 153 C. (307 F.) | | |
| Cured: 10 Minutes | | |
| 300% Modulus, psi | 1170 | 1130 |
| Tensile, psi | 2490 | 2300 |
| % Elongation | 480 | 470 |
| Hardness | 57 | 58 |
| After Aging 2 Days in Test Tubes @ 100 C. (212 F.) | | |
| Tensile, % Retained | 84 | 87 |
| Elongation, % Retained | 83 | 81 |
| Hardness, Points Changed | +6 | +8 |
| After Aging 4 Days in Test Tubes @ 100 C. (212 F.) | | |
| Tensile, % Retained | 70 | 71 |
| Elongation, % Retained | 71 | 68 |
| Hardness, Points Changed | +7 | +7 |
| G.E. Brightness - Before and After 24 Hours Under R.S. Lamp | | |
| Before Exposure | 34.6 | 20.3 |
| After Exposure | 3.3 | 3.7 |

After aging 2 and 4 days in test tubes at 100° C.(212° F.) all of the toluenediamines showed antioxidant tensile and elongation properties and were better than the control (Compound 1). In comparison with AGERITE SUPERLITE SOLID, all of the compounds showed comparable or slightly better retention of original physical properties, but developed compounds that were darker in color. In comparison with AGERITE STALITE S, the cyclopentenyl derivatives of TDA developed similar retention of original physical properties after aging but developed compounds considerably darker in color. (Color is normally not a commercial consideration for this application.)

EXAMPLE 9

Polyurethane-urea elastomers utilizing 5-(cyclopent-2-enyl)-2,4-toluenediamine and 3-(cyclopent-2-enyl)-2,6-toluenediamine were prepared and evaluated for pot life in a pot life test system for the purpose of determining the reactivity of these alkenylated toluenediamines as chain extenders in standard urethane formulations relative to one another. The polyurethane-urea elastomers were formulated by reacting a prepolymer of poly (1,4-oxytetramethylene) glycol end-capped with 2,4-toluenediisocyanate, the prepolymer having an NCO content generally from 5–7%, with the test candidate chain extender aromatic diamine and a diol. The nominal stoichiometric equivalent ratio of isocyanate to diamine chain extender to diol for each sample is 2:1:1. Commercially, the prepolymer is marketed under the trademark ADIPRENE L-167 by the E. I. duPont de Nemours Company and the poly(ξ-caprolactone) diol marketed under the designation CAPA 200 by Interox Chemicals Limited.

The procedure to assay chain extender reactivity begins by dissolving an aromatic diamine in an isoequivalent of CAPA 200. Solid amines may be melted under a protective N₂ blanket, then mixed, to hasten dissolution. The amine/polyol blend is checked for homogeneity and stability at 50° C., then the correct weight is placed in a 35 mm deep, 20 mm i.d. cylindrical stainless steel cup. Alternatively, exact weights of amine and diol are added directly to the test cup instead of being made up in a master batch. The correct weight of ADIPRENE 167 thermostatted at 50° C. is carefully layered above the diol/diamine. The test cup is inserted into a thermostatted block, also 50° C. for the test series described here. Total weight of the 2:1:1 NCO prepolymer:diol:diamine mixture is 7.0 g.

The test system for measuring pot life comprised a heated test chamber for holding 7 grams of test sample at a constant temperature (50° C.) and was equipped with a vertical preforated piston. This piston moves up and down through the test sample in timed relationship. (The temperature rise due to the exothermic reaction is discounted.) The force necessary to move the piston through the polymer sample is measured in arbitrary units, and the relationship of the force is plotted as a function of time. The force-pot life relationship of the urethane system during cure then is correlated to known force-viscosity relationship for the urethane-urea systems.

Table II represents tabular data providing coefficients for an empirical model expressing the logarithm base 10 of viscosity as a third-power polynomial function of time for several chain extender systems including those of this invention. The coefficients apply to the equation:

$$\log (\text{viscosity}) = I + A \text{ (time)} + B \text{ (time)}^2 + C \text{ (time)}^3.$$

The coefficient of the first power term ("A") is a "quasi" reaction rate constant measuring initial reactivity. Smaller values in the "quasi" rate constant (A) indicate longer and desirable pot lives. The value T-5000 is the time in which the reaction product has a relative viscosity of 5000 units. Even though the value is an arbitrary value, that value is relevant for use in determining the performance of the test candidate in a RIM process or a cast elastomer process. For the RIM molding of modest size parts, a T-5000 may be about 2.5 minutes, whereas, the molding of large or intricate parts may require a T-5000 of greater than 5 minutes; e.g., 10 minutes.

TABLE II

Lineshape parameters and T-5000 'pot-life' times for chain extenders are:
Empirical Model of Pot-life Data
$\log (\text{relative viscosity}) = I + A^*(\text{time}) + B^*(\text{time})^{**}2 + C^*(\text{time})^{**}3$

| name acronym | I | A | B | C | T-5000 (min) |
|---|---|---|---|---|---|
| 3-Cyclopentenyl-2,6-toluenediamine 3Cp26TDA | 1.9803 | .71731 | −.10745 | .01145 | 3.52 |
| 3-cyclopentenyl-2,6-toluenediamine 3Cp26TDA | 1.9710 | 0.82284 | −0.13911 | 0.013147 | 3.21 |
| 5-cyclopentenyl-2,4-toluenediamine 5CP24TDA | 1.4469 | −5.0863 | 4.7708 | 4.0085 | 0.62 |
| 5-cyclopentenyl-2,4-toluenediamine 5Cp24TDA | 1.7355 | 3.5938 | −1.7572 | 1.1496 | 0.66 |
| 3,5-Diethyl-2,6-toluenediamine 35DE26TDA | 0.6392 | 5.572 | −6.941 | 3.829 | 1.13 |
| 3,5-Diethyl-2,4-toluenediamine 35DE24TDA | 1.322 | 1.350 | −.1994 | .03511 | 2.03 |
| Diethyltoluenediamine (80/20 isomer mix) DETDA | 1.889 | .8092 | −.1662 | .06490 | 2.21 |
| 4-tertiarybutyl-2,6-toluenediamine 4tB26TDA | 1.916 | 3.867 | −3.407 | 2.411 | .54 |
| 3,5-Diisopropyl-2,6-toluenediamine 35DiP26TDA | 1.620 | 1.563 | −.6099 | .2471 | 1.63 |
| 5-isopropyl-2,4-toluenediamine 5iP24TDA | 2.000 | 3.374 | −.2558 | .7390 | .54 |
| 5-tertiarybutyl-2,4-toluenediamine 5tB24TDA | 2.029 | .7697 | −.001596 | −.007802 | 2.24 |

What is claimed is:

1. A toluenediamine composition having one alkenyl substituent ortho to an amine group and the amine groups are in the 2,3-, 2,4- 2,6- or 3,4-position represented by the formula:

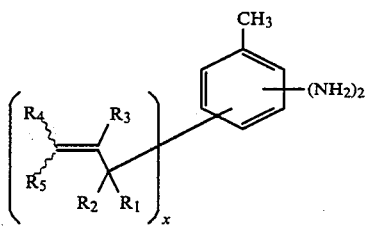

wherein $R_1$, $R_2$, $R_3$, $R_4$ and $R_5$ are hydrogen, $C_{1-3}$ aliphatic, phenyl, halogen or alkoxy radicals, or $R_2$ and $R_4$ or $R_5$ are bridged via an alkylene radical—$(CH_2)_y$— wherein $y=2$ to 5, and x is one provided that in said formula at least one of $R_1$, $R_2$, $R_3$, $R_4$ or $R_5$ is $C_1$ or greater and provided that not more than one is a phenyl, halogen or alkoxy radical.

2. The composition of claim 1 wherein the amine groups in said toluenediamine composition are in the 2 and 4-positions or in the 2 and 6 positions.

3. The composition of claim 2 wherein $R_1$, $R_2$, $R_3$, and $R_4$ are hydrogen and $R_5$ is $C_1$ aliphatic.

4. The composition of claim 2 wherein $R_1$, $R_2$, and $R_3$ are hydrogen and $R_4$ and $R_5$ are $C_1$ aliphatic.

5. The composition of claim 2 wherein $R_1$, $R_3$ and $R_4$ are hydrogen $R_2$ is chlorine and $R_5$ is $C_1$ aliphatic.

6. The composition of claim 2 wherein $R_1$, and $R_4$ are hydrogen and $R_2$, $R_3$ and $R_5$ are $C_1$ aliphatic.

7. The composition of claim 2 wherein $R_2$, $R_3$ and $R_4$ are hydrogen and $R_1$ and $R_5$ are $C_1$ aliphatic.

8. The composition of claim 2 wherein $R_1$, and $R_3$ are hydrogen and $R_2$, $R_4$ and $R_5$ are $C_1$ aliphatic.

9. The composition of claim 2 wherein $R_2$, and $R_3$ are hydrogen and $R_1$ and $R_4$ are $C_1$ and $R_5$ is $C_2$ aliphatic.

10. The composition of claim 2 wherein $R_1$, $R_2$, $R_3$ and $R_4$ are $C_1$ aliphatic and $R_5$ is $C_2$ aliphatic.

11. The composition of claim 2 wherein $R_1$ and $R_2$ are $C_1$ aliphatic and $R_3$, $R_4$, and $R_5$ are hydrogen.

12. The composition of claim 2 wherein $R_1$, $R_3$ and $R_4$ are hydrogen, $R_2$ is phenyl and $R_5$ is a $C_1$ aliphatic.

13. The composition of claim 2 wherein $R_1$, $R_3$ and $R_4$ are hydrogen, $R_2$ is a $C_1$ aliphatic ether and $R_5$ is $C_1$ aliphatic.

14. The composition of claim 2 wherein $R_3$ and $R_4$ are hydrogen, $R_1$ and $R_2$ are $C_1$ aliphatic and $R_5$ is a $C_3$ branched aliphatic.

15. The composition of claim 2 wherein $R_1$, $R_3$ and $R_4$ are hydrogen and $R_2$ and $R_5$ are combined to form a 5 carbon membered ring.

16. The composition of claim 2 wherein $R_1$ and $R_3$ are hydrogen, $R_4$ is $C_1$ aliphatic and $R_2$ and $R_5$ are combined to form a 5 carbon membered ring.

17. A toluenediamine composition having two alkenyl substituents each ortho to an amine group and the amine groups are in the 2,4- or 3,6-position represented by the formula:

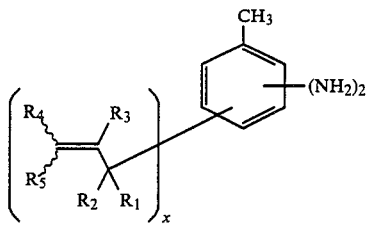

wherein $R_1$, $R_2$, $R_3$, $R_4$ and $R_5$ are hydrogen, $C_{1-3}$ aliphatic, phenyl, halogen or alkoxy radicals, or $R_2$ and $R_4$ or $R_5$ are bridged via an alkylene radical —$(CH_2)_y$— wherein $y=2$ to 5, and x is two provided that in said formula at least one of $R_1$, $R_2$, $R_3$, $R_4$ or $R_5$ is $C_1$ or greater and provided that not more than one is a phenyl, halogen, or alkoxy radical.

18. The composition of claim 17 wherein $R_1$, $R_2$, $R_3$, and $R_4$ are hydrogen and $R_5$ is $C_1$ aliphatic.

19. The composition of claim 17 wherein $R_1$, $R_2$, and $R_3$ are hydrogen and $R_4$ and $R_5$ are $C_1$ aliphatic.

20. The composition of claim 17 wherein $R_1$, $R_3$ and $R_4$ are hydrogen $R_2$ is chlorine and $R_5$ is $C_1$ aliphatic.

21. The composition of claim 17 wherein $R_1$, and $R_4$ are hydrogen and $R_2$, $R_3$ and $R_5$ are $C_1$ aliphatic.

22. The composition of claim 17 wherein $R_2$, $R_3$ and $R_4$ are hydrogen and $R_1$ and $R_5$ are $C_1$ aliphatic.

23. The composition of claim 17 wherein $R_1$, and $R_3$ are hydrogen and $R_2$, $R_4$ and $R_5$ are $C_1$ aliphatic.

24. The composition of claim 17 wherein $R_2$ and $R_3$ are hydrogen and $R_1$ and $R_4$ are $C_1$ and $R_5$ is $C_2$ aliphatic.

25. The composition of claim 17 wherein $R_1$, $R_2$ $R_3$ and $R_4$ are $C_1$ aliphatic and $R_5$ is $C_2$ aliphatic.

26. The composition of claim 17 wherein $R_1$, $R_3$ and $R_4$ are hydrogen and $R_2$ and $R_5$ represents a five carbon membered ring.

27. The composition of claim 17 wherein $R_1$ and $R_2$ are $C_1$ aliphatic and $R_3$, $R_4$ and $R_5$ are hydrogen.

28. The composition of claim 17 wherein $R_1$, $R_3$ and $R_4$ are hydrogen, $R_2$ is a $C_1$ aliphatic ether and $R_5$ is $C_1$ aliphatic.

29. The composition of claim 17 wherein $R_3$ and $R_4$ are hydrogen, $R_1$ and $R_2$ are $C_1$ aliphatic and $R_5$ is a $C_3$ branched aliphatic.

30. The composition of claim 17 wherein $R_1$, $R_3$ and $R_4$ are hydrogen and $R_2$ and $R_5$ are combined to form a 5 carbon membered ring.

31. The composition of claim 17 wherein $R_1$ and $R_3$ are hydrogen, $R_4$ is $C_1$ aliphatic and $R_2$ and $R_5$ are combined to form a 5 carbon membered ring.

* * * * *